(12) United States Patent
Wu et al.

(10) Patent No.: US 9,448,584 B2
(45) Date of Patent: Sep. 20, 2016

(54) MOUNTING APPARATUS FOR DISPLAY

(71) Applicants:HONG FU JIN PRECISION INDUSTRY (WuHan) CO., LTD., Wuhan (CN); HON HAI PRECISION INDUSTRY CO., LTD., New Taipei (TW)

(72) Inventors: Xi-Feng Wu, Wuhan (CN); Hai-Tao Shan, Wuhan (CN); Yi Shu, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 44 days.

(21) Appl. No.: 14/527,187

(22) Filed: Oct. 29, 2014

(65) Prior Publication Data

US 2016/0109904 A1    Apr. 21, 2016

(30) Foreign Application Priority Data

Oct. 15, 2014   (CN) .......................... 2014 1 0544104

(51) Int. Cl.
*F16M 13/00* (2006.01)
*G06F 1/16* (2006.01)
*F16B 2/12* (2006.01)

(52) U.S. Cl.
CPC ............... *G06F 1/1601* (2013.01); *F16B 2/12* (2013.01)

(58) Field of Classification Search
USPC ...................... 248/917, 346.01, 371, 346.04; 361/679.21, 679.22
See application file for complete search history.

(56) References Cited

U.S. PATENT DOCUMENTS

| 8,240,628 B2* | 8/2012 | Huang ................... F16M 11/04 248/122.1 |
| 8,882,069 B2* | 11/2014 | Mahaffey ............ E05B 73/0005 248/310 |
| 2007/0262223 A1* | 11/2007 | Wang .................. B60R 11/0241 248/346.07 |
| 2011/0290975 A1* | 12/2011 | Lin ........................ F16M 11/28 248/346.04 |
| 2012/0312936 A1* | 12/2012 | Huang ................. F16M 11/041 248/122.1 |
| 2013/0026314 A1* | 1/2013 | Hu ....................... F16M 11/041 248/157 |

\* cited by examiner

*Primary Examiner* — Steven Marsh
(74) *Attorney, Agent, or Firm* — Zhigang Ma

(57) ABSTRACT

A mounting apparatus for securing a display includes a base; a clipping device attached to the base, a first positioning device attached to the base, and a second positioning device attached to the base. The clipping device includes a first securing member and a second securing member. The clipping device is moveable relative to the base between a locked position and an unlock position. When the clipping device is located on the locked position, the first securing member and the second securing member are configured to secure to a display. When the clipping device is located on the unlock position, the first securing member is engaged with the first positioning device, the second securing member is engaged with the second positioning device, thereby the first securing member and the second securing member are configured to remove from the display.

17 Claims, 9 Drawing Sheets

MOUNTING APPARATUS FOR DISPLAY

FIELD

The subject matter herein generally relates to a mounting apparatus for a display.

BACKGROUND

An electronic device such as a computer chassis often comprises a main body and a cover attached to the main body. The main body comprises a bottom plate, two side plates, a top plate cooperatively defining a receiving area for receiving electronic components therein. The electronic components can comprises a motherboard, hard disks, a plurality of expansion cards, power supply. Usually, the computer chassis is metal.

BRIEF DESCRIPTION OF THE DRAWINGS

Implementations of the present technology will now be described, by way of example only, with reference to the attached figures.

DETAILED DESCRIPTION

Figure 1:
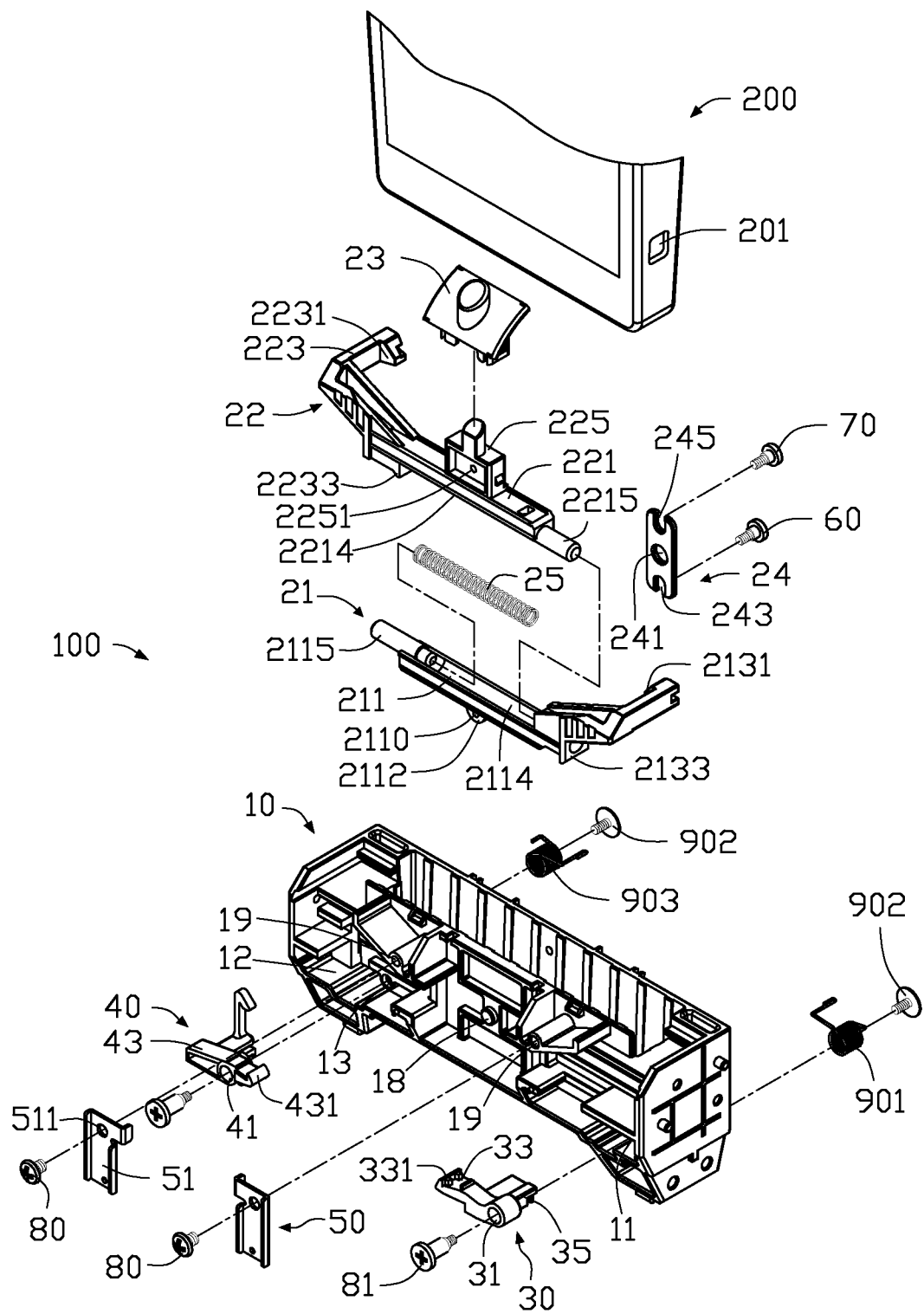
FIG. 1 is an exploded, isometric view of an embodiment of a mounting apparatus and a display.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a mounting apparatus for securing a display. The mounting apparatus includes a base; a clipping device attached to the base, a first positioning device attached to the base, and a second positioning device attached to the base. The clipping device includes a first securing member and a second securing member. The clipping device is moveable relative to the base between a locked position and an unlock position. When the clipping device is located on the locked position, the first securing member and the second securing member are configured to secure to a display. When the clipping device is located on the unlock position, the first securing member is engaged with the first positioning device, the second securing member is engaged with the second positioning device, thereby the first securing member and the second securing member are configured to remove from the display.

Figure 2:
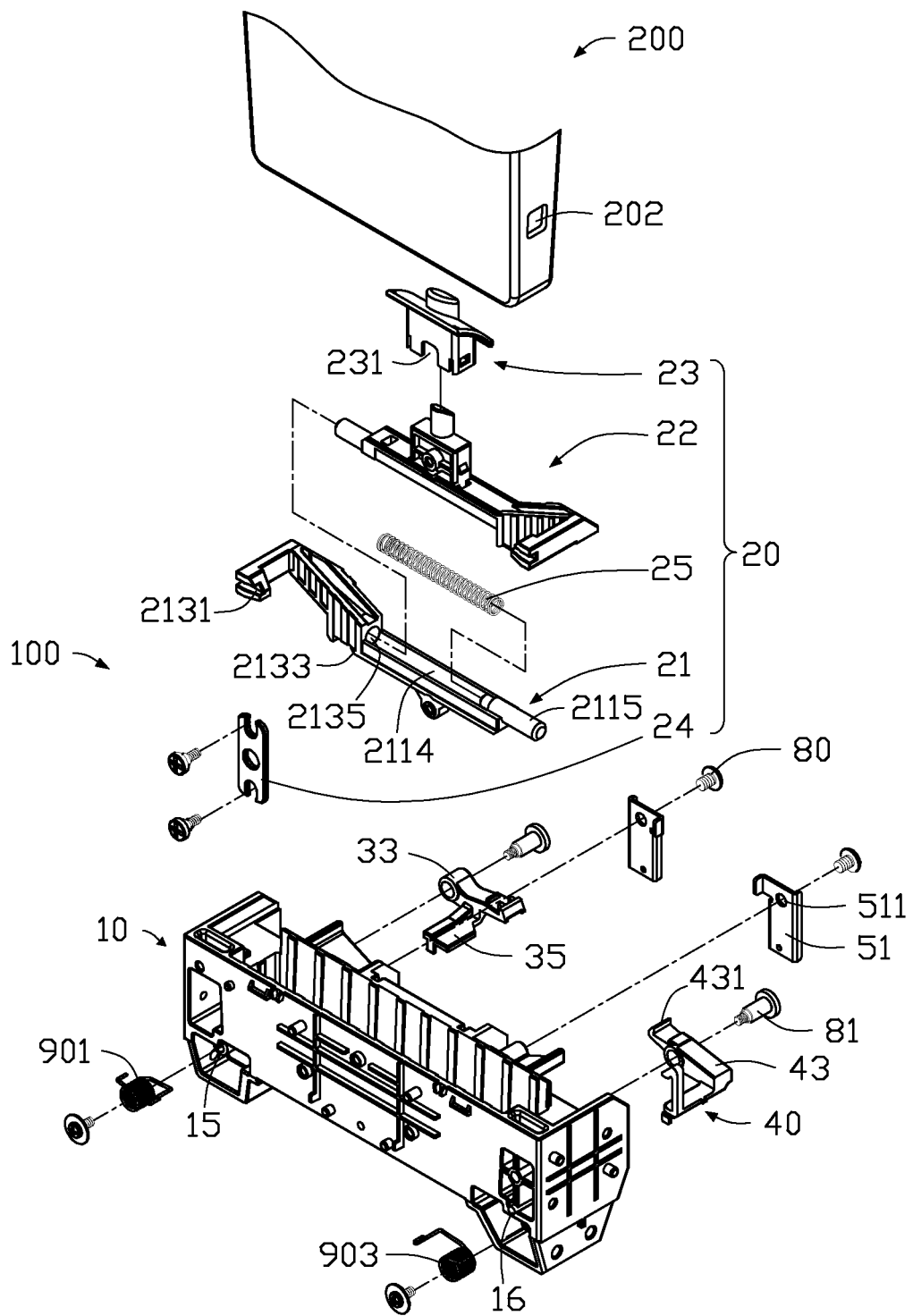
FIG. 2 is similar to FIG. 1, but viewed from a different angle.
Figure 3:
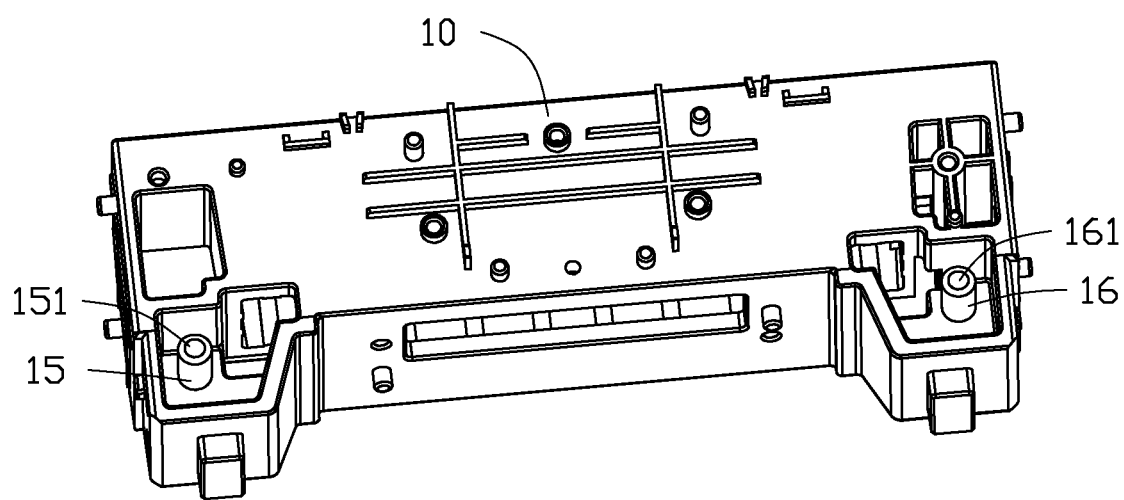
FIG. 3 is an isometric view of a base of the mounting apparatus of FIG. 1.

FIGS. 1-3 illustrate an embodiment of a mounting apparatus 100 for securing a display 200. The mounting apparatus comprises a base 10, a clipping device 20, a first positioning device 30, a second positioning device 40, and a blocking device 50. A first clamping slot 201 and a second clipping slot 202 are defined in the display 200.

The base 10 comprises a first mounting portion 11, a second mounting portion 12, a first fixing post 15, and a second fixing post 16. The base 10 defines a first mounting hole (not shown) and a second mounting hole 13. A first fixing hole 151 and a second fixing hole 161 are defined in the first fixing post 15 and the second fixing post 16 respectively. A protruding post 18 is located on the base 10, and two receiving holes 19 are defined in the base 10 and located on the opposite sides of the protruding post 18.

The clipping device 20 comprises a first securing member 21, a second securing member 22, an operating member 23, a balancing member 24, and a resilient member 25. The first securing member 21 comprises a first coupling arm 211 and a first securing arm 213 coupled to the first coupling arm 211. In at least one embodiment, the first securing arm 213 is slanted relative to the first coupling arm 211. The first coupling arm 211 comprises a coupling portion 2112 with a through hole 2110, a first receiving portion 2114 for receiving the resilient portion 25, and a first inserting portion 2115 coupling to the first receiving portion 2114. The first securing arm 213 comprises a first securing portion 2131 for engaging in the first clamping hole 201 and a first latching portion 2133 for engaging with the first positioning device 30. An accommodating hole 2135 is defined in the first securing arm 213 and communicates with the first receiving portion 2114. The second securing member 22 comprises a second coupling arm 221, a second securing arm 223 coupling with the second coupling arm 221, and an engaging portion 225 with an engaging hole 2251 and located on the second coupling arm 221. In at least one embodiment, the second securing arm 223 is slanted relative to the second coupling arm 221. The second coupling arm 221 comprises a second receiving portion 2214 and a second inserting portion 2215 coupling with the second receiving portion 2214. The second inserting portion 2215 can be engaged in the first accommodating hole 2135. The second securing arm 223 comprises a second securing portion 2231 for engaging in the second clamping hole 202 and a second latching portion 2233 for engaging with the second positioning device 40. A second accommodating hole (not shown) is defined in the second securing arm 223 and communicates with the second receiving portion 2214.

The operating member 23 can be secured to the engaging portion 2251 and defines a cutout 231 communicating with the engaging hole 2251. In at least one embodiment, the operating member 23 can be a decorating plate to engage with the engaging portion 225. The balancing member 24 defines a rotating hole 241, a first positioning slot 243 and a second positioning slot 245. The rotating hole 241 is located between the first positioning slot 243 and the second positioning slot 245 and can be engage with the protruding post 18 to rotatably secure the balancing member 24 to the base 10. A first mounting member 60 can be engaged in the first positioning slot 243 and the through hole 2110 to secure the first securing member 21 to the balancing member 24. A second mounting member 70 can be engaged in the second positioning slot 243, the engaging hole 2251 and the cutout 231 to secure the second securing member 22 to the balancing member 24.

The first positioning device 30 can be secured to the first mounting portion 11 and defines a first retaining hole 31 communicating with the first mounting hole. The first positioning device 30 comprises a first clipping arm 33 and a resisting arm 35 coupling with the first clipping arm 33. A first clipping portion 331 is located on the first clipping arm 33 to engage with the first latching portion 2133.

The second positioning device 40 can be secured to the second mounting portion 12 and defines a second retaining hole 41 communicating with the second mounting hole 13. The second positioning device 40 comprises a second clipping arm 43. A second clipping portion 431 is located on the second clipping arm 43 to engage with the second latching portion 431.

The blocking device 50 comprises two blocking members 51. A punching hole 511 is defined in each of the two blocking members 51 and corresponding to the receiving hole 19. A third mounting member 80 can be engaged in the punching hole 511 and the receiving hole 19 to secure each blocking member 51 to the base 10.

Figure 4:
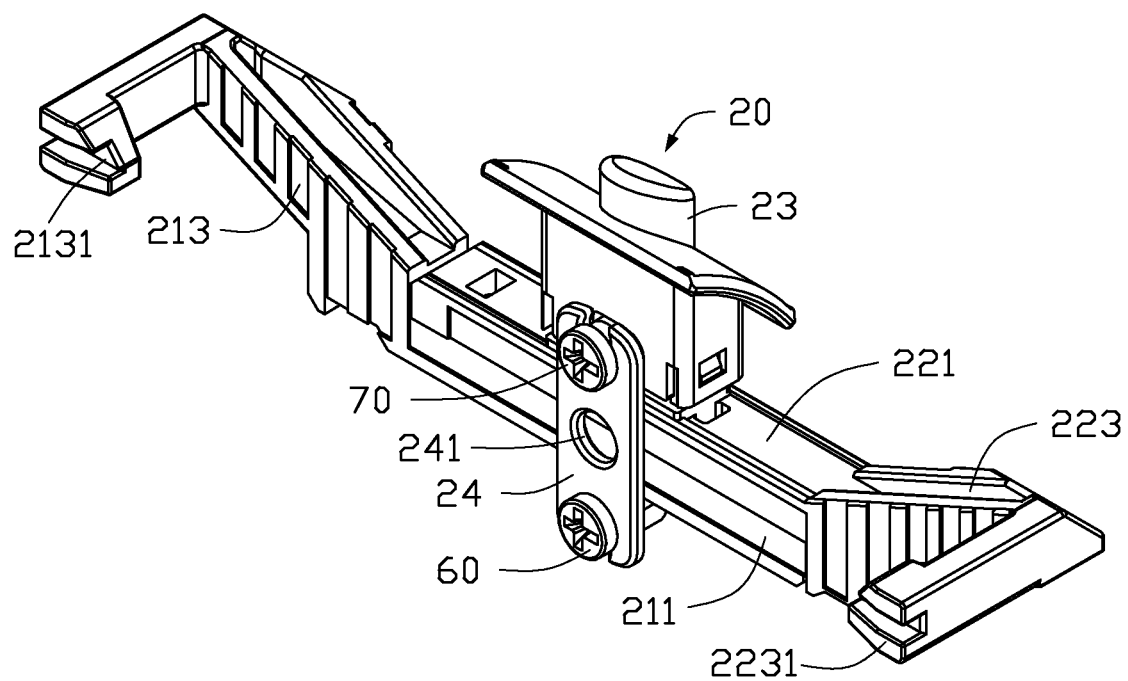
FIG. 4 is an isometric view of a clipping device of the mounting apparatus of FIG. 1.
Figure 5:
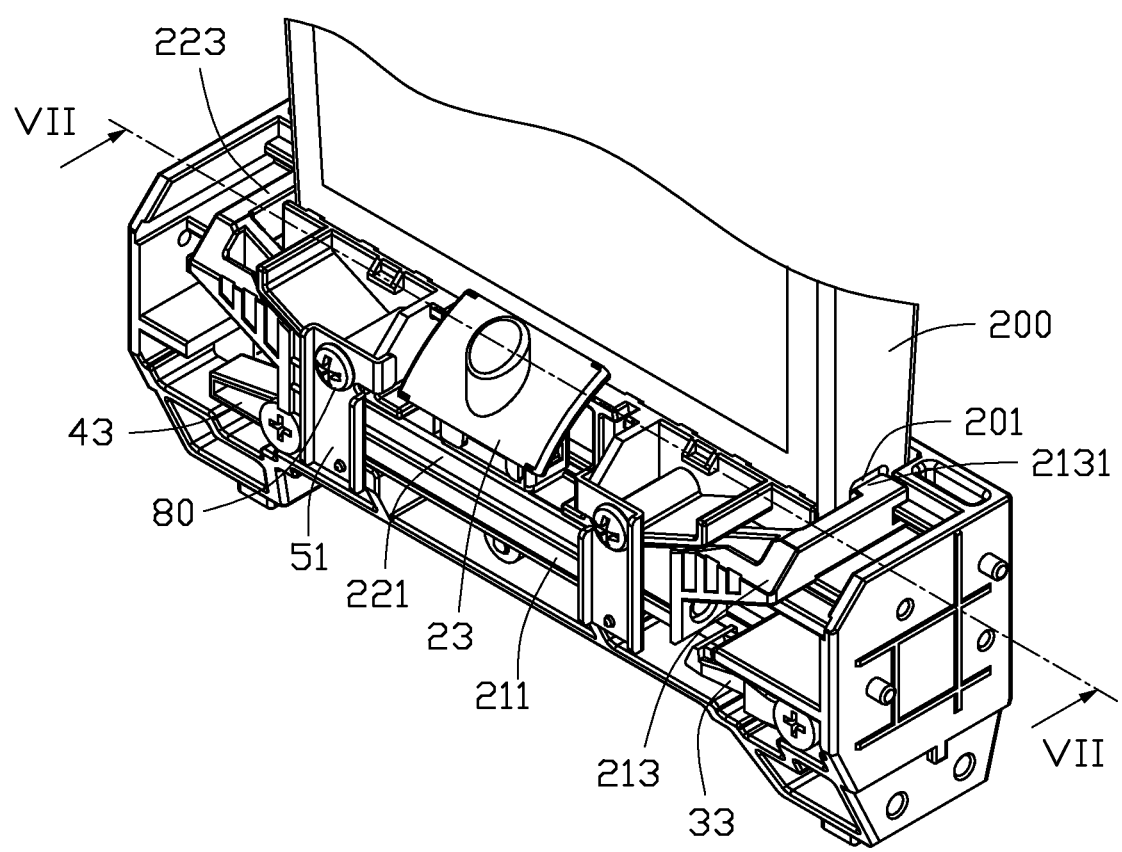
FIG. 5 is an assembled view of the mounting apparatus and the display of FIG. 1.
Figure 6:
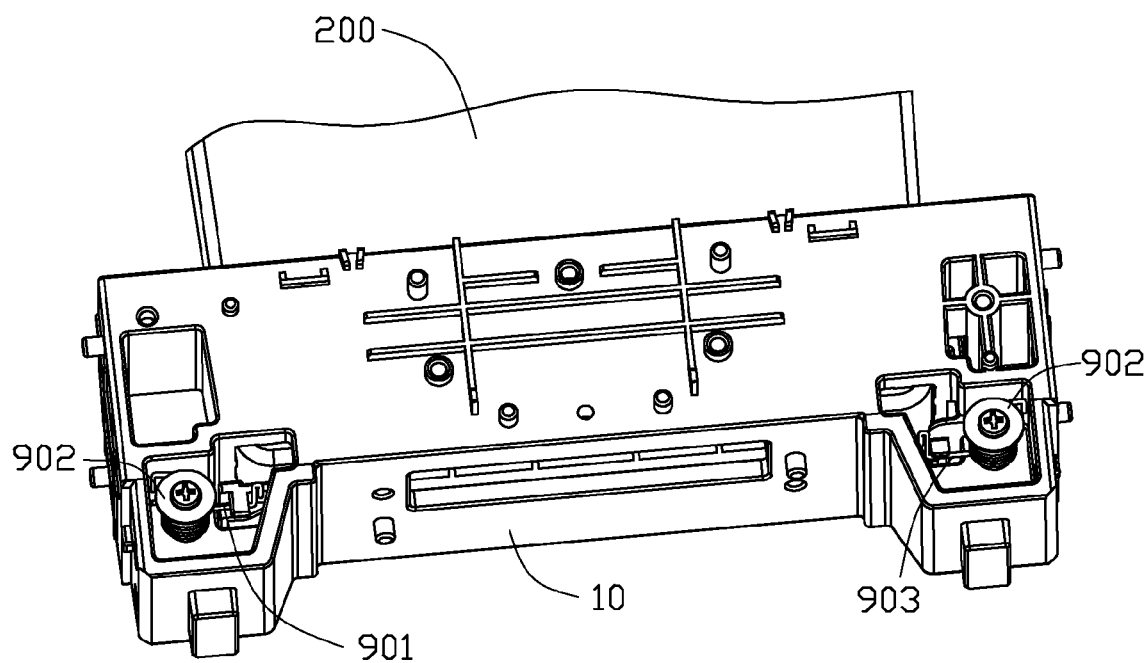
FIG. 6 is an assembled view of the mounting apparatus and the display of FIG. 2.

FIGS. 1 and 4 illustrate in assembly of the clipping device 20, the resilient 25 is placed in the first receiving portion 21, and the second securing member 22 is placed on the first securing member 21. The second receiving portion 2214 is aligned with the first receiving portion 2114 to sandwich the resilient member 25 therebetween. The first inserting portion 2115 is inserted into the second accommodating hole, and the second inserting portion 2215 is inserted into the first accommodating hole 2135 to secure the first securing member 21 to the second securing member 22. The operating member 23 is secured to the engaging portion 225 by means, such as jointing, clips or screws. The balancing member 24 abuts the operating member 23, and the first positioning slot 243 is aligned with the through hole 2110. The first mounting member 60 is secured into the first positioning slot 243 and the through hole 2110 to secure the first mounting member 21 to a first end of the balancing member 24. The second positioning slot 245 is aligned with the engaging hole 2251 and the cutout 231, and the second mounting member 70 is mounted to the second positioning slot 245, the engaging hole 2251 and the cutout 231 to secure the second securing member 22 to a second end of the balancing member 24.

FIGS. 1 and 4-6 illustrate in assembly of the clipping device 20 to the base 10, the protruding post 18 extends through the rotating hole 241 to rotatably mount the balancing member 24 to the base 10. Thus, the clipping device 20 is moveably attached to the base 10. The first retaining hole 31 is aligned with the first mounting hole, and one fourth mounting member 81 is fixed into the first retaining hole 31 and the first mounting hole to secure the first positioning device 30 to the base 10. The second retaining hole 41 is aligned with the second mounting hole 13, and another fourth mounting member 81 is fixed into the second retaining hole 41 and the second mounting hole 13 to secure the second positioning device 40 to the base 10.

The punching hole 511 of each blocking device 50 is aligned with the receiving hole 19. The third mounting member 80 is engaged in the punching hole 511 and the receiving hole 19 to secure each blocking member 51 to the base 10. Thus, each blocking device 50 can block the clipping device 20 from disengaging from the base 10. A first spring 901, such as a torsion spring, is secured to the first fixing post 15, one fifth mounting member 902 extends through the first spring 901 and the first fixing hole 151 to secure the first spring 901 to the base 10, and the free end of the first spring 901 abuts the resisting arm 35. A second spring 903, such as a torsion spring, is secured to the second fixing post 16, another fifth mounting member 902 extends through the second spring 903 and the second fixing hole 161 to secure the second spring 903 to the base 10, and the free end of the second spring 903 abuts the second securing member 22.

Figure 7:
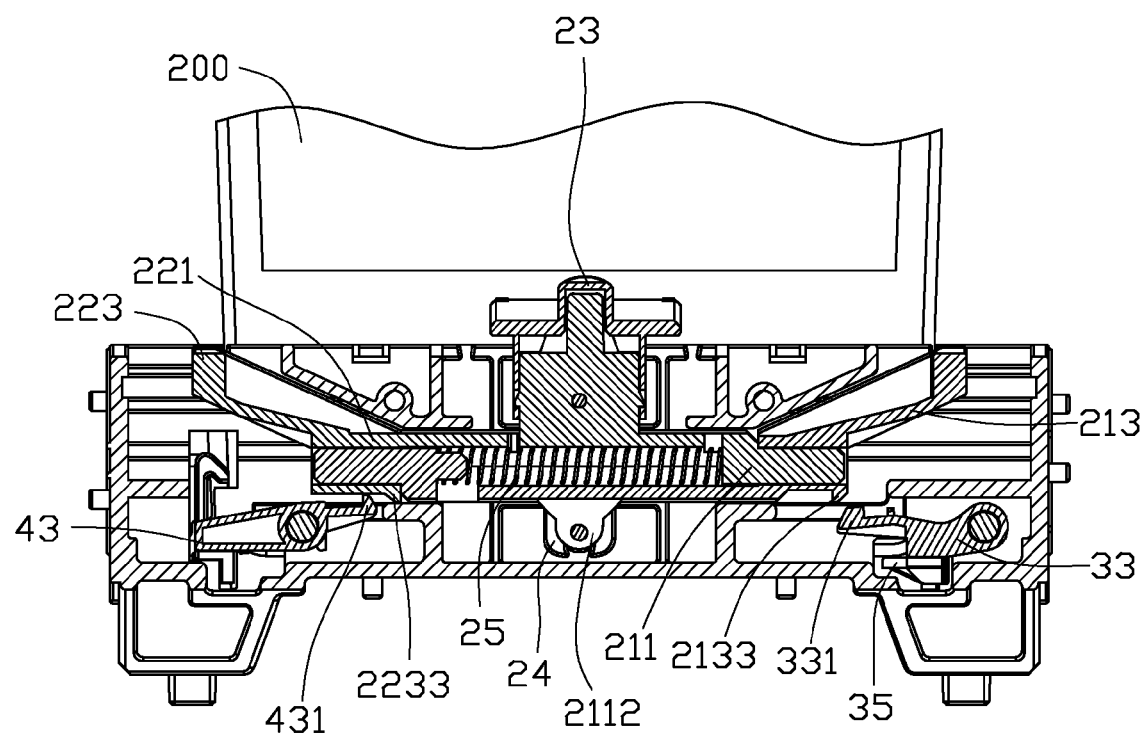
FIG. 7 is a cross-sectional view of FIG. 5, taken along line VII-VII, the clipping device is located on a locked position, a first positioning device is engaged with a first securing member, and a second positioning device is engaged with a second securing member.
Figure 8:
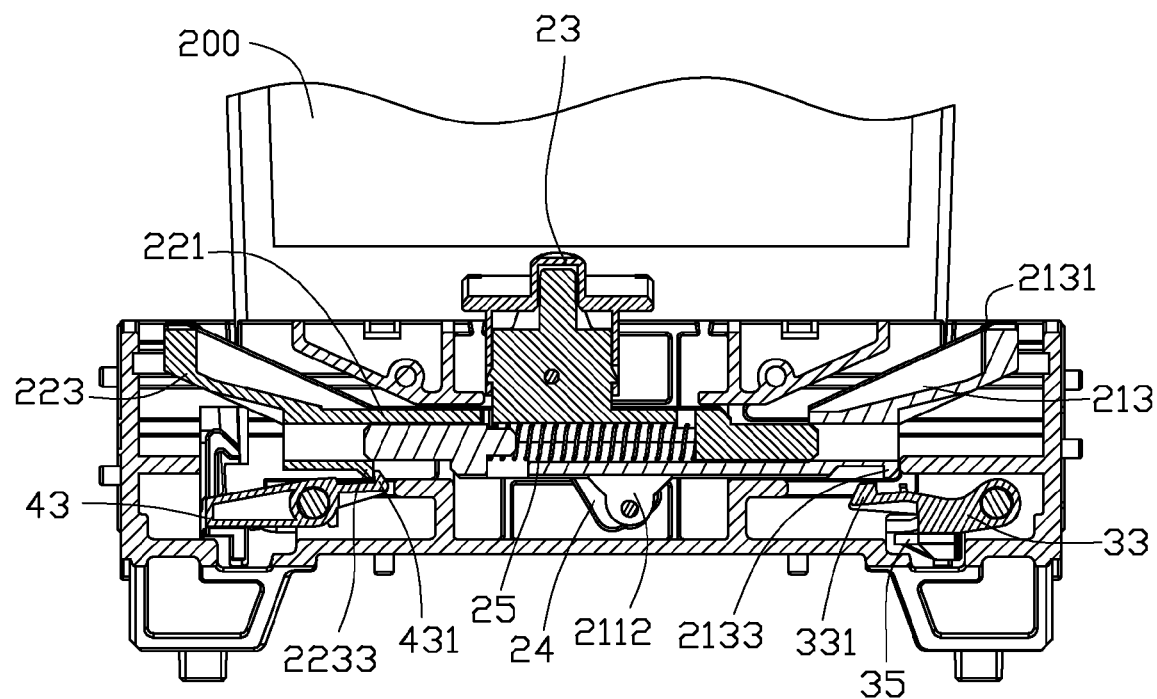
FIG. 8 is similar to FIG. 7, but the first positioning device is engaged with the first securing member, and the second positioning device is disengaged from the second securing member.
Figure 9:
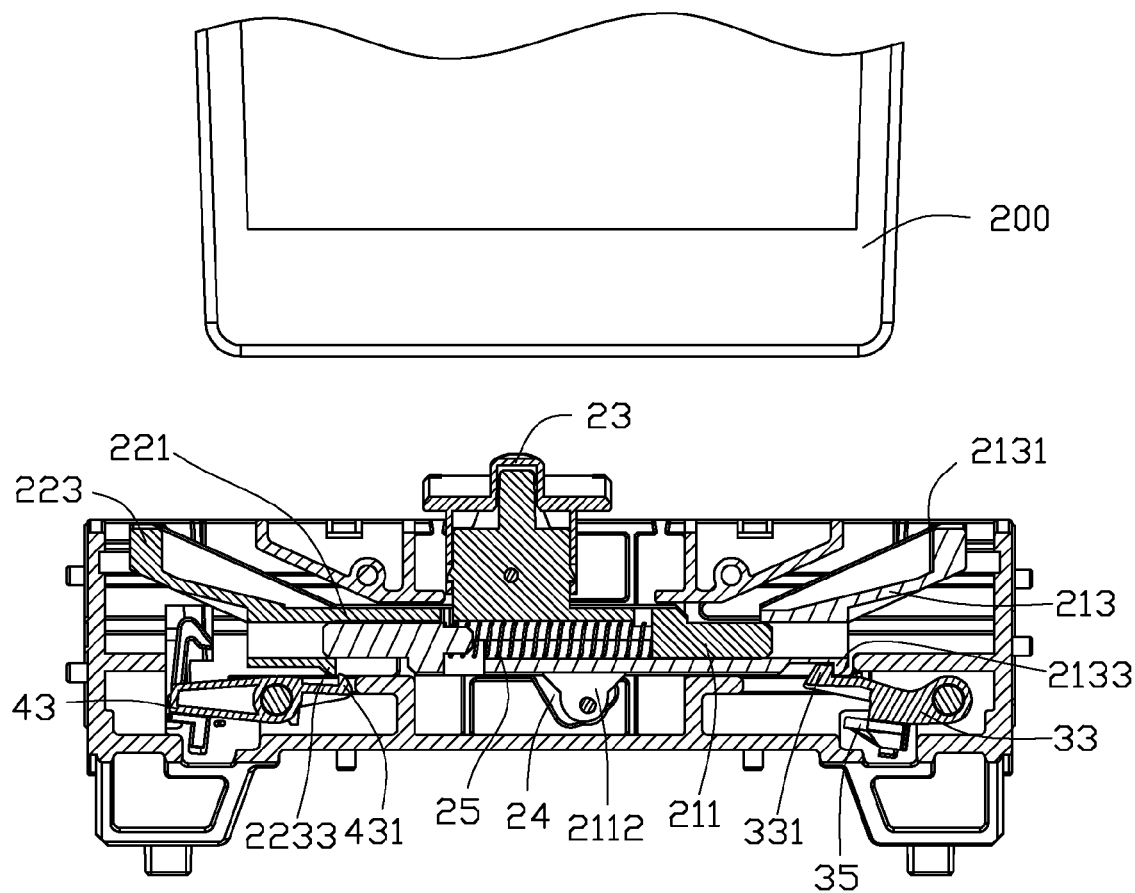
FIG. 9 is similar to FIG. 7, but the clipping device is located on an unlock position, the first positioning device is disengaged from the first securing member, and the second positioning device is disengaged from the second securing member.

Referring to FIGS. 7-9, in use, the clipping device 20 is located on an unlock position (see FIG. 9) and is disengaged from the display 200. The first clipping portion 331 is engaged with the first latching portion 2133, the second clipping portion 431 is engaged with the second latching portion 2233, and the balancing member 24 is deviated from an axis that extends through the protruding post 18.

When the display 200 needs to secure to the mounting apparatus 100, the display 200 is moved vertically to the base 10, until the display 200 is resisted on the resisting arm 35. The display 200 is further moved vertically to move the resisting arm 35 to disengage the first clipping portion 334 from the first latching portion 2133, and the first spring 901 is deformed. At this time, the first securing member 21 is moved towards the second securing member 22, and the second securing member 22 urges the second positioning device 40 to deform the second spring 903 and to disengage the second clipping portion 431 from the second latching portion 2233. Therefore, the first securing member 21 and the second securing member 22 can be moved near to each other, and the balancing member 24 is rotated about the protruding post 18. When the balancing member 24 is coincided with the anis that extending through the protruding post 18, the first securing portion 2131 and the second securing portion 2231 are engaged in the first clamping slot 201 and the second clamping slot 202 respectively. Thus, the clipping device 20 can be located on a locked position (see FIG. 8).

In disassembly of the display 200, the operating member 23 is operated, and the first securing member 21 and the second securing member 22 are moved away from each other, until the first securing portion 2131 and the second securing portion 2231 are removed from the first clamping slot 201 and the second clamping slot 202 respectively and the second clipping portion 431 is clipped to the second latching portion 2233. The second spring 903 is released to prevent the second clipping portion 431 from disengaging from the second latching portion 2233. The display 200 is removed away from the base 10 to remove from the resisting arm 35, the first spring 901 is rebound to engage the first clipping portion 331 with the first latching portion 2133, until the clipping device 20 is located on an unlock position.

The embodiments shown and described above are only examples. Many details are often found in the art such as the other features of a base. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A mounting apparatus comprising:
a base;
a first positioning device attached to the base;
a second positioning device attached to the base; and
a clipping device attached to the base, the clipping device comprising a first securing member and a second securing member, the clipping device moveable relative to the base between a locked position and an unlock position, wherein when the clipping device is in the locked position, the first securing member and the second securing member are configured to secure to a display, and when the clipping device is in the unlock position, the first securing member is engaged with the first positioning device, the second securing member is engaged with the second positioning device, and the first securing member and the second securing member are configured to be removed from the display;
wherein the first positioning device comprises a first clipping portion engaged with the first securing member and a resisting arm coupled with the first clipping portion, and the resisting arm is moveable by the display to disengage the first clipping portion from the first securing member.

2. The mounting apparatus of claim 1, wherein the first positioning device is configured to be moveable by the display, thereby the first securing member and the second securing member are moveable towards each other to engage with the display.

3. The mounting apparatus of claim 1, wherein the second securing member is moveable to disengage from the display, thereby the first securing member and the second securing member are moveable away from each other to disengage from the display.

4. The mounting apparatus of claim 3, wherein the clipping device further comprises an operating member secured to the second securing member, and the operating member is configured to move the second securing member from the display.

5. The mounting apparatus of claim 1, wherein the clipping device further comprises a balancing member rotatably attached to the base, and the first securing member is coupled with the second securing member by the balancing member.

6. The mounting apparatus of claim 5, wherein the balancing member is deviated from an axis when the clipping device is located on the unlock position, and the balancing member is coincided with the axis when the clipping device is located on the locked position.

7. The mounting apparatus of claim 1, wherein a resilient member is located between the first securing member and the second securing member, and the resilient member is deformed when the clipping device is located on the locked position.

8. The mounting apparatus of claim 1, wherein a first spring is located on the base, and the first spring is resisted on the first positioning device.

9. The mounting apparatus of claim 1, wherein the first securing member comprises a first securing portion, the second securing member comprises a second securing portion, and the first securing portion and the second securing portion are configured to secure in a first clamping slot and a second clamping slot of the display.

10. A mounting apparatus comprising:
a base;
a clipping device attached to the base, the clipping device comprising a first securing member and a second securing member; and
a first positioning device attached to the base and engaged with the first securing member,
wherein the first positioning device is movable to disengage from the first securing member, the first securing member and the second securing member moveable towards each other to engage with a display;
wherein the first positioning device comprises a first clipping portion engaged with the first securing member and a resisting arm coupled with the first clipping portion, and the resisting arm is moveable by the display to disengage the first clipping portion from the first securing member.

11. The mounting apparatus of claim 10, further comprising a second positioning device attached to the base, wherein the second positioning device is engaged with the second securing member to prevent the second securing member from moving towards the first securing member.

12. The mounting apparatus of claim 10, wherein the second securing member is moveable to disengage from the display, thereby the first securing member and the second securing member are moveable away from each other to disengage from the display.

13. The mounting apparatus of claim 12, wherein the clipping device further comprises an operating member secured to the second securing member, and the operating member is configured to move the second securing member from the display.

14. The mounting apparatus of claim 10, wherein the clipping device further comprises a balancing member rotatably attached to the base, and the first securing member is coupled with the second securing member by the balancing member.

15. The mounting apparatus of claim 14, wherein the balancing member is deviate from an axis when the clipping device is located on the unlock position, and the balancing member is coincided with the axis when the first securing member is secured to the display.

16. The mounting apparatus of claim 10, wherein a resilient member is located between the first securing member and the second securing member, and the resilient member is deformed when the first securing member is secured to the display.

17. The mounting apparatus of claim 10, wherein the first securing member comprises a first securing portion, the second securing member comprises a second securing portion, and the first securing portion and the second securing portion are configured to secure in a first clamping slot and a second clamping slot of the display.

* * * * *